United States Patent [19]

Käser

[11] Patent Number: 5,049,238

[45] Date of Patent: Sep. 17, 1991

[54] METHOD OF DYEING PAPER UTILIZING TRISAZO DYES

[75] Inventor: Adolf Käser, Bottmingen, Switzerland

[73] Assignee: Ciba-Geigy Corporation, Ardsley, N.Y.

[21] Appl. No.: 382,135

[22] Filed: Jul. 19, 1989

[30] Foreign Application Priority Data

Jul. 22, 1988 [CH] Switzerland ............ 2808/88

[51] Int. Cl.$^5$ ............ D21H 21/28; C09B 35/35; C09B 67/02
[52] U.S. Cl. ............ 162/162; 8/524; 8/552; 8/564; 8/585; 8/597; 8/919; 534/811; 534/812; 534/815; 534/728
[58] Field of Search ............ 534/811, 812, 815, 728; 8/919; 162/162

[56] References Cited

U.S. PATENT DOCUMENTS

| | | | |
|---|---|---|---|
| 536,532 | 3/1895 | Kirchhoff | 534/815 |
| 536,880 | 4/1895 | Kirchhoff | 534/813 |
| 1,540,485 | 6/1925 | Laska et al. | 534/812 |
| 1,635,594 | 7/1927 | Wagner | 534/812 X |
| 1,877,800 | 9/1932 | Brightman | 534/815 X |
| 2,112,920 | 4/1938 | Mendoza et al. | 534/714 |
| 2,203,196 | 6/1940 | Hanhart | 534/815 X |
| 2,286,714 | 6/1942 | Chechak | 534/812 X |
| 4,009,156 | 2/1977 | Kramb | 534/815 |
| 4,387,050 | 6/1983 | Nickel | 534/815 X |

FOREIGN PATENT DOCUMENTS

| | | | |
|---|---|---|---|
| 72392 | 12/1901 | Fed. Rep. of Germany. | |
| 425990 | 3/1935 | United Kingdom | 534/815 |
| 803810 | 11/1958 | United Kingdom | 534/815 |
| 1569259 | 6/1980 | United Kingdom. | |

OTHER PUBLICATIONS

Anderau, *Chemical Abstracts*, vol. 57, No. 3013b (1962).

*Primary Examiner*—Mary C. Lee
*Assistant Examiner*—Fiona T. Powers
*Attorney, Agent, or Firm*—George R. Dohmann; Edward McC. Roberts

[57] ABSTRACT

A method of dyeing paper utilizing dyes suitable for dyeing paper in blue shades having the formula wherein
R is hydrogen, —OH, —OR$^1$, —NH$_2$, NHR$^1$, —NH-COR$^1$, —NHSO$_2$R$^1$, —NHCONH$_2$ or —NH-CONHR$^1$, in which R$^1$ is unsubstituted alkyl or alkyl substituted by C$_1$–C$_4$-alkoxy, hydroxy-substituted C$_1$–C$_4$-alkoxy, phenyl, phenoxy or phenylcarbamoyl, in each instance the phenyl moiety being unsubstituted or substituted by C$_1$–C$_4$-alkoxy, C$_1$–C$_4$-alkoxy or phenoxy, R$^1$ is also unsubstituted phenyl or naphthyl or phenyl or naphthyl which is substituted by sulfo, carboxy, C$_1$–C$_4$-alkyl, C$_1$–C$_4$-alkoxy, halogen, nitro, C$_1$–C$_4$-alkylcarbonylamino or C$_1$–C$_4$-alkoxycarbonylamino;

X, each independently of the other, is hydrogen, unsubstituted alkyl or alkoxy or alkyl or alkoxy which is substituted by C$_1$–C$_4$-alkoxy, hydroxy-substituted C$_1$–C$_4$-alkoxy, phenyl, phenoxy or phenylcarbamoyl, in each instance the phenyl moiety being unsubstituted or substituted by C$_1$–C$_4$-alkyl, C$_1$–C$_4$-alkoxy or phenoxy or X is halogen, sulfo or carboxy;

Y is unsubstituted alkyl or alkoxy or alkyl or alkoxy which is substituted by C$_1$–C$_4$-alkoxy, hydroxy-substituted C$_1$–C$_4$-alkoxy, phenyl, phenoxy or phenylcarbamoyl, in each instance the phenyl moiety being unsubstituted or substituted by C$_1$–C$_4$-alkyl, C$_1$–C$_4$-alkoxy or phenoxy or Y is halogen, sulfo or carboxy;

M is hydrogen or a colorless cation; and
n is 1 or 2;

with the proviso that the —OH group in the α-position and the azo group in the β-position of the naphthalene nucleus are mutually interchangeable.

8 Claims, No Drawings

METHOD OF DYEING PAPER UTILIZING TRISAZO DYES

Particular requirements are made at the present time of dyes which are used for dyeing paper. The dyes shall have, for example, a high degree of exhaustion under the special dyeing conditions, they shall produce dyeings of good wetfastness properties, and they shall be so readily soluble that it is possible to prepare liquid formulations. The blue paper dyes obtainable at the present time do not fulfil these conditions in all respects.

Blue dyes have now been found which are preeminently suitable for dyeing paper and which meet the requirements referred to above very well. In addition, the dyes give very good coloristic yields.

Accordingly, the present invention relates to dyes of formula

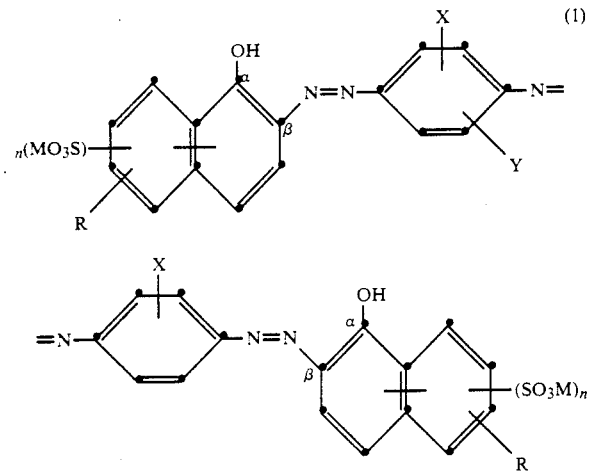

wherein
R is hydrogen, —OH, —OR$^1$, —NH$_2$, —NHR$^1$, —NH-COR$^1$, —NHSO$_2$R$^1$, —NHCONH$_2$ or —NH-CONHR$^1$, in which R$^1$ is unsubstituted or substituted alkyl or aryl,
X are each independently of the other hydrogen, unsubstituted or substituted alkyl or alkoxy, or halogen, sulfo or carboxy,
Y is unsubstituted or substituted alkyl or alkoxy, or halogen, sulfo or carboxy,
M is hydrogen or the equivalent of a colourless cation, and
n is 1 or 2,
and the —OH group in the α-position and the azo group in the β-position of the naphthalene nucleus are mutually interchangeable.

R$^1$ as alkyl may be unsubstituted or substituted, unbranched or branched alkyl or cycloalkyl. Cycloalkyl preferably contains 5 to 8 carbon atoms, and open-chain alkyl contains 1 to 8 carbon atoms.

Unbranched or branched open-chain alkyl may suitably be: methyl, ethyl, n-propyl and isopropyl, n-butyl, sec-butyl or tert-butyl, n-pentyl and isopentyl, n-hexyl and isohexyl or 2-ethylhexyl.

These alkyl radicals may carry one or more substituents, for example C$_1$–C$_4$alkoxy, hydroxy-substituted C$_1$–C$_4$alkoxy, phenoxy or phenylcarbamoyl, the phenyl moiety in each of said last three radicals may be substituted, for example by C$_1$–C$_4$alkyl, C$_1$–C$_4$alkoxy or phenoxy. Examples of suitable radicals of this type are: hydroxyethyl, 1-hydroxyisopropyl, ethoxymethyl, 2-hydroxyethoxypentyl, benzyl, 1-phenylethyl, 2-phenylethyl, 1-methyl-2-phenylethyl, 1-isobutyl-3-phenylpropyl, 1,5-diphenylpent-3-yl, 1-methyl-2-phenoxyethyl or 1-methyl-2-phenylcarbamoylethyl.

As unsubstituted or substituted C$_5$–C$_8$cycloalkyl R$^1$ is preferably cyclopentyl or cyclohexyl. Possible substituents are preferably C$_1$–C$_4$alkyl, most preferably methyl.

R$^1$ as aryl is preferably naphthyl and, most preferably, phenyl, which radicals may be substituted, for example by sulfo, carboxy, C$_1$–C$_4$alkyl, C$_1$–C$_4$alkoxy, halogen such as fluoro, chloro or bromo, nitro, C$_1$–C$_4$-alkylcarbonylamino or C$_1$–C$_4$alkoxycarbonyl.

The preferred meaning of R$^1$ is unsubstituted C$_1$–C$_4$alkyl or phenyl.

X or Y as halogen is fluoro, bromo or, preferably, chloro.

X and Y as alkyl are suitably the alkyl radicals cited above for R$^1$. Suitable alkoxy radicals are the cited alkyl radicals which are attached through —O— to the phenylene rings.

The preferred meanings of X are hydrogen, C$_1$–C$_4$alkyl or C$_1$–C$_4$alkoxy, chloro or sulfo. Hydrogen, methyl and methoxy are especially preferred.

Y is preferably C$_1$–C$_4$alkyl or C$_1$–C$_4$alkoxy, chloro or sulfo. Methyl and methoxy are especially preferred.

M is hydrogen or the equivalent of a colourless cation, for example lithium, sodium, potassium, ammonium or the protonated form of a C$_4$–C$_{12}$trialkylamine, C$_4$–C$_{12}$diamine or C$_2$–C$_{12}$alkanolamine.

M as a protonated C$_4$–C$_{12}$trialkylamine may be, for example, protonated N-ethyldimethylamine, N,N-diethylmethylamine, tri-n-propylamine, tri-n-butylamine, triisobutylamine and, in particular, triethylamine or triisopropylamine. Mixtures of different protonated amines are also suitable.

M as a protonated C$_4$–C$_{12}$diamine is, for example, an ethylenediamine or 1,3-diaminopropane in which one or both N-atoms are additionally substituted by one or two C$_1$–C$_4$alkyl radicals, preferably by methyl or ethyl groups. M is in this case preferably a N,N-dialkylethylenediamine or N,N-dialkyl-1,3-diaminopropane, for example N-ethylethylenediamine, N,N-dimethylethylenediamine, N,N'-dimethylethylenediamine, N,N-diethylethylenediamine, 3-dimethylamino-1-propylamine or 3-diethylamino-1-propylamine.

M as a protonated C$_2$–C$_{12}$alkanolamine may be, for example, the protonated form of a monoalkanolamine, dialkanolamine, monoalkanolmonoalkylamine, monoalkanoldialkylamine, dialkanolalkylamine or trialkanolamine, or a mixture of different protonated alkanolamines. Examples are protonated 2-aminoethanol, bis(2-hydroxyethyl)amine, N-(2-hydroxyethyl)dimethylamine, N-(2-hydroxyethyl)diethylamine, N,N-bis(2-hydroxyethyl)methylamine, N,N-bis(2-hydroxyethyl)ethylamine or tris(2-hydroxyethyl)amine, 2-(2-aminoethoxy)ethanol or diethylaminopropylamine.

The preferred meaning of M is Na$^\oplus$, Li$^\oplus$ or protonated C$_4$–C$_6$alkanolamine, and tris(2-hydroxyethyl)amine, bis(2-hydroxyethyl)amine or a mixture of these two amines are the preferred C$_4$–C$_6$-alkanolamines.

Preferred dyes of formula (1) are those wherein R is hydrogen, OH or NH$_2$.

Further preferred dyes of formula (1) are those wherein the —OH groups are in the α-position and the azo groups are in the β-position of the naphthalene nuclei.

Particularly preferred dyes are those of formula

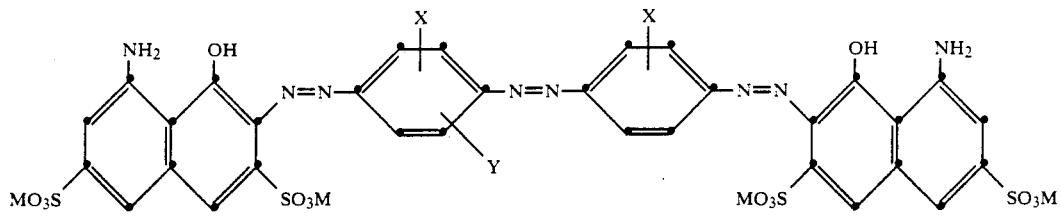

(2)

wherein X and Y are as defined for formula (1) and M is Na$^\oplus$, Li$^\oplus$ or protonated $C_4$–$C_6$alkanolamine.

Among these dyes, the dyes of formula

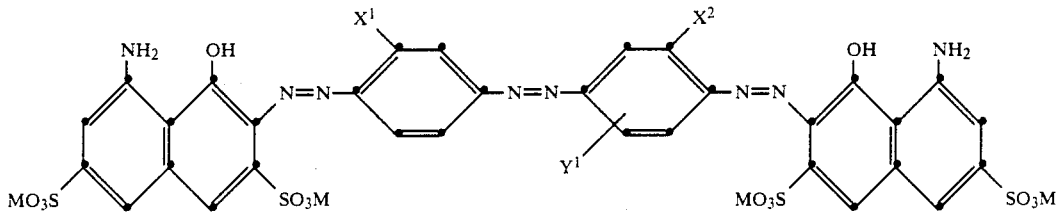

(3)

merit particular interest. In formula (3), $X^1$ and $X^2$ are each independently of the other hydrogen, methyl or methoxy, $Y^1$ is methyl or methoxy, and M is Na$^\oplus$, Li$^\oplus$ or protonated $C_4$–$C_6$alkanolamine.

The dyes of formulae (1) to (3) are prepared in a manner which is known per se, for example by tetrazotising a substituted 4,4'-diaminoazobenzene and coupling the tetrazo intermediate to a naphtholsulfonic acid.

The present invention further relates to a process for dyeing paper, which comprises the use of dyes of formula (1) above.

The dyes of formula (1) may be used in solid or liquid form for dyeing paper.

In powder or granular form, the dyes are used in particular for discontinuous pulp dyeing, in which the dye is added batchwise to the pulper, hollander or mixing chest. In this process, the dyes are preferably used as dye formulations which may contain extenders, for example urea as solubiliser, dextrin, Glauber's salt, sodium chloride as well as dispersants, dust inhibitors and chelating agents such as tetrasodium pyrophosphate.

The invention therefore also relates to solid dye formulations for dyeing paper, which formulations contain dyes of formula (1).

In recent years, the use of concentrated aqueous solutions of dyes has gained importance on account of the advantages which such solutions have compared with dyes in powder form. The use of solutions avoids the problems associated with dust formation and frees the end-user from the time-consuming and often difficult operation of dissolving the dye powder in water. The use of concentrated solutions has also been promoted by the development of continuous processes for dyeing paper, as in such processes it is expedient to add the solution direct to the hollander or at any other suitable juncture in paper manufacture.

Accordingly, the present invention also relates to concentrated aqueous solutions of dyes of formula (1), which solutions contain not less than 10 percent by weight, for example 10 to 30 percent by weight, of dye, based on the total weight of the solution. The solutions preferably contain 20 to 30 percent by weight of dye.

Concentrated aqueous solutions of dyes of formula (1) can be prepared, for example, by filtering the suspension obtained in the synthesis of the dye, effecting deionisation, if appropriate, for example by a membrane separating process, and stabilising the dye by the addition of an assistant, for example urea, ε-caprolactam or polyethylene glycol. It is also possible, however, to suspend the isolated dye in hydrochloric acid, to filter the suspension once more, and to mix the filter cake with lithium hydroxide or a suitable amine, for example an alkanolamine, and the requisite amount of water. Finally, it is also possible to carry out the coupling in the presence of LiOH, ammonia or alkanolamine, and to deionise the synthesis solution. Such dye solutions are suitable for dyeing a paper pulp in the presence of rosin and alum solution.

The dye solutions so obtained preferably contain, per 100 parts of dye in the form of the free acid, 400 to 900 parts of water, 0 to 200 parts of further assistants such as urea, ε-caprolactum or polyethylene glycol as well as sufficient of a base that the pH is in the range from 7 to 10. Suitable bases are NaOH, LiOH, ammonia or organic amines, for example alkanolamines.

The aqueous concentrates of this invention, which are stable at storage temperatures of up to −5° C., are suitable for dyeing paper on which they give, with or without the use of a size, attractive blue shades.

Dyes which are similar to the dyes of formula (1) are known, but their utility for dyeing paper has not been contemplated. Compared with the known blue paper dyes, the eligible dyes of formula (1) are distinguished by the feature that the dyeings produced by them on paper have improved coloristic yields.

In the following Examples, parts and percentages are by weight.

EXAMPLE 1

A solution of the coupling component is prepared by dissolving 70.2 parts of the sodium salt of 1-amino-8-naphthol-3,6-disulfonic acid at pH 7 to 8 in 250 parts of water. Then 22.6 parts of 4,4'-diamino-2-methylazobenzene in 250 parts of water and 55 parts of 32% hydrochloric acid are diazotised by addition of 52 parts by volume of 4N sodium nitrite solution at a temperature in the range from 0° to 5° C. The diazo solution is then added dropwise over 1 hour to the above solution of the coupling component, while keeping the pH between 8 and 9 by addition of 4N aqueous sodium hydroxide solution. The dye of formula

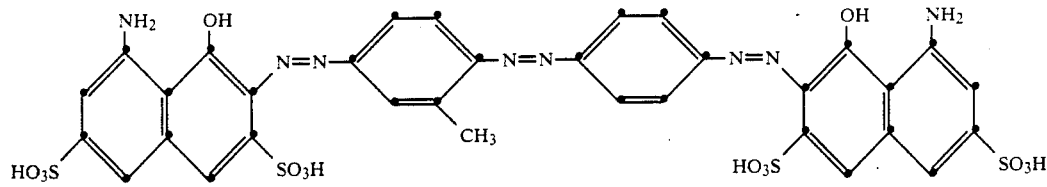

is isolated as sodium salt by salting out with sodium chloride. It dyes paper in brilliant blue shades. The filter cake can be processed direct to liquid formulations. The tinctorial properties on paper are excellent. The good affinity for paper is to be singled out for special mention.

EXAMPLE 2

200 parts of the dye of Example 1 in the form of the free dye acid of low salt content are homogenised by stirring in 500 parts of water and dissolved at 40° C. by addition of 75 parts of diethanolamine and 100 parts of urea. The solution is clarified by addition of a filter aid. The filtrate is cooled to room temperature and diluted to 1000 parts with water, to give a stable dye solution which constitutes a liquid formulation.

Instead of using diethanolamine, it is also possible to use monoethanolamine, triethanolamine, 2-(2-aminoethoxy)ethanol, the polyglycol amines disclosed in German Offenlegungsschrift 2 061 760, ammonia, tetramethylammonium hydroxide, lithium hydroxide or lithium carbonate.

EXAMPLE 3

A liquid formulation of the dye of Example 1 as lithium salt is prepared as follows:

70.2 parts of 1-amino-8-naphthol-3,6-disulfonic acid are dissolved in 400 parts of water by adding sufficient LiOH to adjust the pH to 7-8. The tetrazo component described in Example 1 is then added dropwise to this solution at 5°-10° C. over 1 hour, while keeping the pH between 8 and 9 by addition of 3N lithium hydroxide solution. The resultant dye solution is deionised using a conventional membrane under customary conditions by reverse osmosis and then concentrated to a weight of 600 g.

A stable dye solution is obtained. If desired, the rheological properties of this solution can be changed by adding an amide, for example urea or ε-caprolactam, in amount of ca. 30 to 120 g.

EXAMPLES 4-55

Liquid formulations of further dyes can be obtained in the manner described in Examples 1 to 3 by replacing the tetrazo component and coupling component used in Example 1 by those listed in columns 2 and 3 respectively of the following Table. The dyes colour paper in the shade indicated in the last column of the Table.

| Example | Tetrazo-component | Coupling component | Shade on paper |
| --- | --- | --- | --- |
| 4 | 4,4'-diamino-2-methylazobenzene | 1-amino-8-hydroxynaphthalene-2,4-disulfonic acid | blue |
| 5 | 4,4'-diamino-2-methylazobenzene | 1-amino-8-hydroxynaphthalene-4,6-disulfonic acid | blue |
| 6 | 4,4'-diamino-2-methylazobenzene | 1,8-dihydroxynaphthalene-3,6-disulfonic acid | blue |
| 7 | 4,4'-diamino-2-methylazobenzene | 1-hydroxynaphthalene-3,6-disulfonic acid | reddish blue |
| 8 | 4,4'-diamino-2-methylazobenzene | 1-hydroxynaphthalene-3,8-disulfonic acid | reddish blue |
| 9 | 4,4'-diamino-2-methylazobenzene | 2-hydroxynaphthalene-5,7-disulfonic acid | violet |
| 10 | 4,4'-diamino-2-methylazobenzene | 2-hydroxynaphthalene-6,8-disulfonic acid | violet |
| 11 | 4,4'-diamino-2-methylazobenzene | 2-hydroxynaphthalene-3,6-disulfonic acid | violet |
| 12 | 4,4'-diamino-2-methylazobenzene | 2-(3'-sulfoanilino)-5-hydroxynaphthalene-7-sulfonic acid | reddish blue |
| 13 | 4,4'-diamino-2-methylazobenzene | 2-anilino-5-hydroxynaphthalene-7-sulfonic acid | reddish blue |
| 14 | 4,4'-diamino-2-methoxyazobenzol | 1-amino-8-hydroxynaphthalene-3,6-disulfonic acid | blue |
| 15 | 4,4'-diamino-2-methoxyazobenzene | 1-amino-8-hydroxynaphthalene-2,4-disulfonic acid | blue |
| 16 | 4,4'-diamino-2-methoxyazobenzene | 1-amino-8-hydroxynaphthalene-4,6-disulfonic acid | blue |
| 17 | 4,4'-diamino-2-methoxyazobenzene | 1,8-dihydroxynaphthalene-3,6-disulfonic acid | blue |
| 18 | 4,4'-diamino-2-methoxyazobenzene | 1-hydroxynaphthalene-3,6-disulfonic acid | reddish blue |
| 19 | 4,4'-diamino-2-methoxyazobenzene | 1-hydroxynaphthalene-3,8-disulfonic acid | reddish blue |
| 20 | 4,4'-diamino-2-methoxyazobenzene | 2-hydroxynaphthalene-5,7-disulfonic acid | violet |
| 21 | 4,4'-diamino-2-methoxyazobenzene | 2-hydroxynaphthalene-6,8-disulfonic acid | violet |

-continued

| Example | Tetrazo-component | Coupling component | Shade on paper |
|---|---|---|---|
| 22 | 4,4'-diamino-2-methoxyazobenzene | 2-hydroxynaphthalene-3,6-disulfonic acid | violet |
| 23 | 4,4'-diamino-2-methoxyazobenzene | 2-(3'-sulfoanilino)-5-hydroxynaphthalene-7-sulfonic acid | blue |
| 24 | 4,4'-diamino-2-methoxyazobenzene | 2-anilino-5-hydroxynaphthalene-7-sulfonic acid | reddish blue |
| 25 | 4,4'-diamino-2,5-dimethylazobenzene | 1-amino-8-hydroxynaphthalene-3,6-disulfonic acid | blue |
| 26 | 4,4'-diamino-2,5-dimethylazobenzene | 1-amino-8-hydroxynaphthalene-2,4-disulfonsäure | greenish blue |
| 27 | 4,4'-diamino-2,5-dimethylazobenzene | 1-amino-8-hydroxynaphthalene-4,6-disulfonic acid | blue |
| 28 | 4,4'-diamino-2,5-dimethylazobenzene | 1,8-dihydroxynaphthalene-3,6-disulfonic acid | blue |
| 29 | 4,4'-diamino-2,5-dimethylazobenzene | 1-hydroxynaphthalene-3,6-disulfonic acid | reddish blue |
| 30 | 4,4'-diamino-2,5-dimethylazobenzene | 1-hydroxynaphthalene-3,8-disulfonic acid | reddish blue |
| 31 | 4,4'-diamino-2,5-dimethylazobenzene | 2-hydroxynaphthalene-5,7-disulfonic acid | violet |
| 32 | 4,4'-diamino-2,5-dimethylazobenzene | 2-hydroxynaphthalene-6,8-disulfonic acid | violet |
| 33 | 4,4'-diamino-2,5-dimethylazobenzene | 2-hydroxynaphthalene-3,6-disulfonic acid | violet |
| 34 | 4,4'-diamino-2,5-dimethylazobenzene | 2-(3'-sulfoanilino)-5-hydroxynaphthalene-7-sulfonic acid | blue |
| 35 | 4,4'-diamino-2,5-dimethylazobenzene | 2-anilino-5-hydroxynaphthalene-7-sulfonic acid | blue |
| 36 | 4,4'-diamino-2-methyl-5-methoxy-azobenzene | 1-amino-8-hydroxynaphthalene-3,6-disulfonic acid | greenish blue |
| 37 | 4,4'-diamino-2-methyl-5-methoxy-azobenzene | 1-amino-8-hydroxynaphthalene-4,6,-disulfonic acid | blue |
| 38 | 4,4'-diamino-2-methyl-5-methoxy-azobenzene | 1-amino-8-hydroxynaphthalene-2,4-disulfonic acid | greenish blue |
| 39 | 4,4'-diamino-2-methyl-5-methoxy-azobenzene | 1,8-dihydroxynaphthalene-3,6-disulfonic acid | blue |
| 40 | 4,4'-diamino-2-methyl-5-methoxy-azobenzene | 1-hydroxynaphthalene-3,6-disulfonic acid | blue |
| 41 | 4,4'-diamino-2-methyl-5-methoxy-azobenzene | 1-hydroxynaphthalene-3,8-disulfonic acid | blue |
| 42 | 4,4'-diamino-2-methyl-5-methoxy-azobenzene | 2-hydroxynaphthalene-5,7-disulfonic acid | reddish blue |
| 43 | 4,4'-diamino-2-methyl-5-methoxy-azobenzene | 2-hydroxynaphthalene-6,8-disulfonic acid | reddish blue |
| 44 | 4,4'-diamino-2-methyl-5-methoxy-azobenzene | 2-hydroxynaphthalene-3,6-disulfonic acid | reddish blue |
| 45 | 4,4'-diamino-2-methyl-5-methoxy-azobenzene | 2-(3'-sulfoanilino)-5-hydroxynaphthalene-7-sulfonic acid | blue |
| 46 | 4,4'-diamino-2-methyl-5-methoxy-azobenzene | 2-anilino-5-hydroxynaphthalene-7-sulfonic acid | blue |
| 47 | 4,4'-diamino-2,5-dimethoxyazobenzene | 1-amino-8-hydroxynaphthalene-3,6-disulfonic acid | greenish blue |
| 48 | 4,4'-diamino-2,5-dimethoxyazobenzene | 1,8-dihydroxynaphthalene-3,6-disulfonic acid | greenish blue |
| 49 | 4,4'-diamino-2,5-dimethoxyazobenzene | 1-hydroxynaphthalene-3,6-disulfonic acid | blue |
| 50 | 4,4'-diamino-3-methylazobenzene | 1-amino-8-hydroxynaphthalene-3,6-disulfonic acid | blue |
| 51 | 4,4'-diamino-3-methylazobenzene | 1,8-dihydroxynaphthalene-3,6-disulfonic acid | blue |
| 52 | 4,4'-diamino-3-methylazobenzene | 1-hydroxynaphthalene-3,6-disulfonic acid | reddish blue |
| 53 | 4,4'-diamino-3-methoxyazobenzene | 1-amino-8-hydroxynaphthalene-3,6-disulfonic acid | blue |
| 54 | 4,4'-diamino-3-methoxyazobenzene | 1,8-dihydroxynaphthalene-3,6-disulfonic acid | blue |
| 55 | 4,4'-diamino-3- | 1-hydroxynaphthalene-3,6-di- | reddish |

| Example | Tetrazo-component | Coupling component | Shade on paper |
|---------|-------------------|--------------------|-----------------|
| | methoxyazobenzene | sulfonic acid | blue |

EXAMPLE 56

70 parts of chemically bleached softwood sulfite pulp and 30 parts of chemically bleached birchwood sulfite pulp are beaten in 2000 parts of water in a hollander. To this pulp is added 2.5 parts of the dye solution described in Example 2. After mixing for 20 minutes, paper is prepared from this pulp. The absorbent paper so obtained is dyed blue. The wastewater is almost colourless.

EXAMPLE 57

0.5 part of the dye powder of Example 1 is dissolved in 100 parts of hot water and the solution is cooled to room temperature. This solution is added to 100 parts of chemically bleached sulfite pulp which has been beated in 2000 parts of water in a hollander. After mixing thoroughly for 15 minutes, sizing is effected in conventional manner with rosin size and aluminium sulfate. Paper prepared from this pulp is dyed in a blue shade of good wetfastness properties.

EXAMPLE 58

97 g of the sodium salt of the dye obtained according to Example 1 are stirred in 600 ml of water and then 160 ml of nitrobenzene, 81.4 g of tributylamine and 44 ml of 32% HCl are added at 50° C. The mixture is stirred at 70° C. until the dye has transferred completely to the organic phase. The aqueous phase is discarded and the organic phase is washed with two 600 ml portions of hot water. Then 300 ml of water and 80.0 g of triethanolamine are added and the mixture is stirred at 85° C. until the dye has transferred completely to the aqueous phase. The aqueous phase is freed from traces of nitrobenzene and tributylamine by steam distillation. A stable dye solution is obtained. The organic phase is used direct for further extractions.

What is claimed is:

1. A method of dyeing paper which comprises the step of applying an unsymmetrical dye of the formula

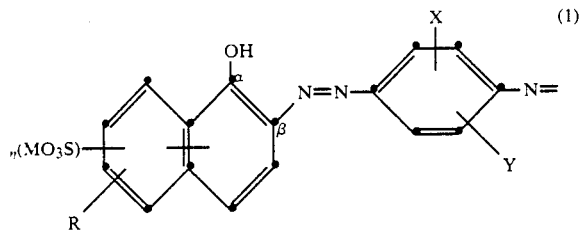

(1)

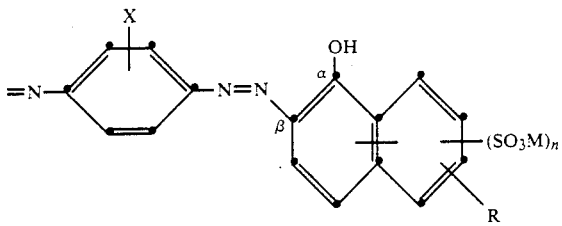

wherein

R is hydrogen, —OH, —OR$^1$, —NH$_2$, —NHR$^1$, —NHCOR$^1$, —NHSO$_2$R$^1$, —NHCONH$_2$ or —NHCONHR$^1$, in which R$^1$ is unsubstituted alkyl or alkyl substituted by C$_1$-C$_4$-alkoxy, hydroxy-substituted C$_1$-C$_4$-alkoxy, phenyl, phenoxy or phenylcarbamoyl, in each instance the phenyl moiety being unsubstituted or substituted by C$_1$-C$_4$-alkyl, C$_1$-C$_4$-alkoxy or phenoxy, R$^1$ is also unsubstituted phenyl or naphthyl or phenyl or naphthyl which is substituted by sulfo, carboxy, C$_1$-C$_4$-alkyl, C$_1$-C$_4$-alkoxy, halogen, nitro, C$_1$-C$_4$-alkylcarbonylamino or C$_1$-C$_4$-alkoxycarbonylamino;

X, each independently of the other, is hydrogen, unsubstituted alkyl or alkoxy or alkyl or alkoxy which is substituted by C$_1$-C$_4$-alkoxy, hydroxy-substituted C$_1$-C$_4$-alkoxy, phenyl, phenoxy or phenylcarbamoyl, in each instance the phenyl moiety being unsubstituted or substituted by C$_1$-C$_4$-alkyl, C$_1$-C$_4$-alkoxy or phenoxy, or X is halogen, sulfo or carboxy; Y is unsubstituted alkyl or alkoxy or alkyl or alkoxy which is substituted by C$_1$-C$_4$-alkoxy, hydroxy-substituted C$_1$-C$_4$-alkoxy, phenyl, phenoxy or phenylcarbamoyl, in each instance the phenyl moiety being unsubstituted or substituted by C$_1$-C$_4$-alkyl, C$_1$-C$_4$-alkoxy or phenoxy, or Y is halogen, sulfo or carboxy;

M is hydrogen or a colorless cation; and n is 1 or 2;

with the proviso that the —OH group in the α-position and the azo group in the β-position of the naphthalene nucleus are mutually interchangeable.

2. A method of claim 1 wherein R is hydrogen, —OH or —NH$_2$.

3. A method of claim 1 wherein the —OH groups are in the α-position and the azo groups are in the β-position of the naphthalene nucleus.

4. A method of claim 1 wherein X is hydrogen, methyl, or methoxy and Y is methyl or methoxy.

5. A method of dyeing paper which comprises the step of applying an unsymmetrical dye of the formula

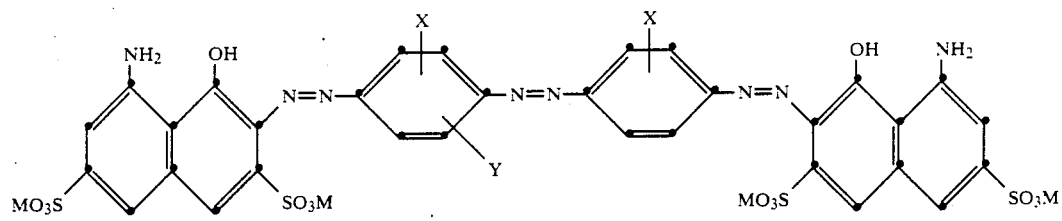

(2)

wherein
X, each independently of the other, is hydrogen, unsubstituted alkyl or alkoxy or alkyl or alkoxy which is substituted by $C_1$–$C_4$-alkoxy, hydroxy-substituted $C_1$–$C_4$-alkoxy, phenyl, phenoxy or phenylcarbamoyl, in each instance the phenyl moiety being unsubstituted or substituted by $C_1$–$C_4$-alkyl, $C_1$–$C_4$-alkoxy or phenoxy or X is halogen, sulfo or carboxy;

Y is unsubstituted alkyl or alkoxy or alkyl or alkoxy which is substituted by $C_1$–$C_4$-alkoxy, hydroxy-substituted $C_1$–$C_4$-alkoxy, phenyl, phenoxy or phenylcarba.noyl, in each instance the phenyl moiety being unsubstituted or substituted by $C_1$–$C_4$-alkyl, $C_1$–$C_4$-alkoxy or phenoxy, or Y is halogen, sulfo or carboxy;

M is a Na or Li cation or a protonated $C_4$–$C_6$-alkanolamine;

with the proviso that the —OH group in the α-position and the azo group in the β-position of the naphthalene nucleus are mutually interchangeable.

6. A method of dyeing paper which comprises the step of applying an unsymmetrical dye of the formula

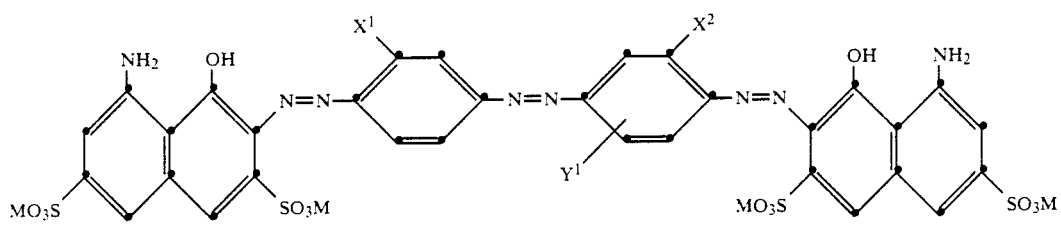

(3)

wherein $X^1$ and $X^2$ are each independently of the other hydrogen, methyl or methoxy, $Y^1$ is methyl or methoxy and M is a Na or Li cation or a protonated $C_4$–$C_6$-alkanolamine.

7. A method of claim 1 wherein both X substituents are hydrogen.

8. Paper which has been dyed by a method of claim 1.

* * * * *